Patented Dec. 27, 1932

1,892,000

UNITED STATES PATENT OFFICE

FERDINAND W. NITARDY, OF BROOKLYN, NEW YORK; WALTER G. CHRISTIANSEN, OF GLENN RIDGE, NEW JERSEY; AND SIDNEY E. HARRIS, OF BROOKLYN, NEW YORK, ASSIGNORS TO E. R. SQUIBB & SONS, OF NEW YORK, N. Y., A CORPORATION OF NEW YORK

HALOGENATED DIHYDROXY DIPHENYL

No Drawing.  Application filed October 7, 1931. Serial No. 567,466.

This invention relates to, and has for its object the provision of, halogenated dihydroxy diphenyls all the halogens and hydroxyls of which are linked to carbon atoms of the same benzene nucleus, more particularly compounds having the general formula $C_6H(OH)_2XYC_6H_5$ wherein X represents a halogen and Y represents hydrogen or a halogen, and methods of preparing them. These compounds have marked bactericidal properties, not much diminished by the presence of organic matter.

In the practice of this invention, compounds having the general formula $C_6H(OH)_2XYC_6H_5$ wherein X represents a halogen and Y represents hydrogen or a halogen are made by treating a solution of dihydroxy diphenyl—that is, $C_6H_3(OH)_2C_6H_5$—with a reactant selected from the group comprising free halogens and substances capable of readily yielding free halogens—in the approximate proportion of one molecule of the former to two or four available atoms of the latter, according as the monohalogen or dihalogen compound is desired—, and removing the hydrogen halide and the solvent.

Example 1

Preparation of monochloro 3,4-dihydroxy diphenyl: A solution of 37 g. of 3,4-dihydroxy diphenyl in 200 cc. of glacial acetic acid is warmed to between 40 and 45° C. and, while stirring vigorously, 30 g. (an equimolecular proportion) of sulfuryl chloride is added at such a rate as to maintain the temperature constant. After the mixture has stood for a short time, the acid is removed by distillation under reduced pressure, the oily residue is washed with water until acid-free, and dissolved in ether or benzene; the solution is dried, and the solvent expelled by distillation. There remains monochloro 3,4-dihydroxy diphenyl in the form of a viscous reddish oil, which partly crystallizes on long standing.

Example 2

Preparation of dichloro 3,4-dihydroxy diphenyl: A solution of 9.3 g. of 3,4-dihydroxy diphenyl in 50 cc. of glacial acetic acid is warmed to about 40° C. and, with energetic stirring while maintaining a temperature of between 40 and 50° C., 15 g. of sulfuryl chloride is added dropwise, and the reaction mixture is allowed to stand for a short time. Removal of the acetic acid is effected by diluting with water and washing the precipitated oil several times with water, the residue is dissolved in ether and dried over anhydrous sodium sulfate, and the ether is distilled off. A thick oil remains.

Example 3

Preparation of monobromo 3,4-dihydroxy diphenyl: Into a solution of 9.3 g. of 3,4-dihydroxy diphenyl in 50 cc. of glacial acetic acid, 8 g. of bromine is dropped while stirring; and the compound, a thick dark oil, may be isolated in the manner of Example 2.

Example 4

Preparation of dibromo 3,4-dihydroxy diphenyl: Into a solution of 9.3 g. of 3,4-dihydroxy diphenyl in 50 cc. of glacial acetic acid, 16 g. of bromine is added dropwise with constant stirring, and the solution is permitted to stand until practically decolorized. Then the acetic acid is distilled off under reduced pressure, and the residue is thoroughly washed with water and dried by solution in ether and agitation with sodium sulfate. Removal of the ether leaves a thick red oil.

Example 5

Preparation of monochloro 2,5-dihydroxy diphenyl: A solution of 18.6 g. of 2,5-dihydroxy diphenyl in 100 cc. of glacial acetic acid is warmed to 45° C. and 15 g. of sulfuryl chloride is added dropwise so as to maintain a temperature of about 50° C. After the reaction mixture has stood 30 minutes, the acetic acid is distilled off under reduced pressure, and water is added to wash any free acid from the residue. The desired compound soon crystallizes out, and may be recrystallized from petroleum ether.

In these examples, carbon tetrachloride and carbon disulfide are among the solvents that may be used instead of glacial acetic acid; for the bromine, potassium bromate and an acid is substitutable; and for the sulfuryl chloride, either gaseous chlorine, hypochlorites, or bleaching powder.

Monohalogen compounds produced in accordance with this invention are presumably mixtures of isomers; and the halogens in the dihalogen 3,4-dihydroxy diphenyl very likely occupy the "2" and "5" positions.

It is to be understood that the foregoing embodiments are merely illustrative and not limitative of the invention, which may assume various other forms—for instance, as to the particular halogens introduced and the specific reactants, solvents, and procedures—within the scope of the appended claims.

We claim:

1. Compounds having the general formula $C_6H(OH)_2XYC_6H_5$ wherein X represents a halogen and Y represents hydrogen or a halogen.

2. Phenyl monohalogen dihydroxy benzenes.

3. Phenyl monochloro dihydroxy benzene.

4. 1-phenyl monochloro 3,4-dihydroxy benzene.

5. 1-phenyl monochloro 2,5-dihydroxy benzene.

6. Phenyl monobromo dihydroxy benzene.

7. 1-phenyl monobromo 3,4-dihydroxy benzene.

8. In the preparation of compounds having the general formula $C_6H(OH)_2XYC_6H_5$ wherein X represents a halogen and Y represents hydrogen or a halogen, the step of treating a solution of phenyl dihydroxy benzene with a reactant selected from the group consisting of free halogens and substances capable of readily yielding free halogens.

9. In the preparation of phenyl monohalogen dihydroxy benzene, the step of treating a solution of phenyl dihydroxy benzene with a reactant selected from the group consisting of free halogens and substances capable of readily yielding free halogens, in the approximate proportion of one molecule of the former to two available atoms of the latter.

10. In the preparation of phenyl monochloro dihydroxy benzene, the step of treating a solution of phenyl dihydroxy benzene with a reactant selected from the group consisting of free chlorine and substances capable of readily yielding free chlorine, in the approximate proportion of one molecule of the former to two available atoms of the latter.

11. In the preparation of phenyl monobromo dihydroxy benzene, the step of treating a solution of phenyl dihydroxy benzene with a reactant selected from the group consisting of free bromine and substances capable of readily yielding free bromine, in the approximate proportion of one molecule of the former to two available atoms of the latter.

12. In the preparation of 1-phenyl monochloro 3,4-dihydroxy benzene, the step of treating 1-phenyl 3,4-dihydroxy benzene with an equimolecular proportion of sulfuryl chloride.

In witness whereof we affix our signatures.

FERDINAND W. NITARDY.
WALTER G. CHRISTIANSEN.
SIDNEY E. HARRIS.